(12) United States Patent
Konuma et al.

(10) Patent No.: US 7,388,741 B2
(45) Date of Patent: Jun. 17, 2008

(54) SOLID ELECTROLYTIC CAPACITOR AND METHOD FOR PRODUCING THE SAME

(75) Inventors: Hiroshi Konuma, Nagano (JP); Kenki Kobayashi, Nagano (JP); Toru Sawaguchi, Nagano (JP)

(73) Assignee: Show A Denko K.K., Tokyo (JP)

( * ) Notice: Subject to any disclaimer, the term of this patent is extended or adjusted under 35 U.S.C. 154(b) by 222 days.

(21) Appl. No.: 10/535,812

(22) PCT Filed: Nov. 20, 2003

(86) PCT No.: PCT/JP03/14798

§ 371 (c)(1),
(2), (4) Date: Dec. 14, 2005

(87) PCT Pub. No.: WO2004/047130

PCT Pub. Date: Jun. 3, 2004

(65) Prior Publication Data

US 2006/0152883 A1    Jul. 13, 2006

Related U.S. Application Data

(60) Provisional application No. 60/430,063, filed on Dec. 2, 2002.

(30) Foreign Application Priority Data

Nov. 21, 2002   (JP) ............................. 2002-337421

(51) Int. Cl.
   *H01G 9/04*   (2006.01)
   *H01G 9/145*  (2006.01)
   *H01G 9/00*   (2006.01)
(52) U.S. Cl. ...................... 361/528; 361/532; 29/25.03
(58) Field of Classification Search ................ 361/523, 361/525–527, 528–529, 532
   See application file for complete search history.

(56) References Cited

U.S. PATENT DOCUMENTS 6,168,639 B1   1/2001   Taketani et al.

(Continued)

FOREIGN PATENT DOCUMENTS

EP      1 030 324 A      8/2000

(Continued)

*Primary Examiner*—Eric Thomas
(74) *Attorney, Agent, or Firm*—Sughrue Mion, PLLC

(57) ABSTRACT

A solid electrolytic capacitor comprising a capacitor element obtainable by compressing a porous valve-acting metal substrate having on the dielectric film surface thereof a solid electrolyte layer containing an electrically conducting polymer in the thickness direction, wherein assuming that the maximum thickness and the minimum thickness of the electrically conducting polymer layer including the substrate before the compression are Hamax and Hamin, and the maximum thickness and the minimum thickness of the electrically conducting polymer layer after the compression are Hbmax and Hbmin, the percentage decrease ΔH in the difference of thickness represented by the following formula is preferably from 5 to 95%: Formula (I). The thin solid electrolytic capacitor element of the present invention, which can be stably produced with a small variety in shape, enables fabrication of a solid electrolytic multilayer capacitor having a high-capacitance and small-size with a low height, which, free from short-circuit failure, exhibits stable performance $$\Delta H(\%) = \left[1 - \frac{(Hb\max - Hb\min)}{(Ha\max - Ha\min)}\right] \times 100. \qquad (I)$$

25 Claims, 2 Drawing Sheets

U.S. PATENT DOCUMENTS

| | | |
|---|---|---|
| 6,229,689 B1 | 5/2001 | Kobayashi et al. |
| 6,313,979 B1 | 11/2001 | Taketani et al. |
| 2002/0001168 A1 | 1/2002 | Atsushi et al. |
| 2002/0097550 A1* | 7/2002 | Shimada et al. ............ 361/532 |

FOREIGN PATENT DOCUMENTS

| | | | |
|---|---|---|---|
| EP | 1 202 300 A | | 5/2002 |
| JP | 3-6217 A | | 1/1991 |
| JP | 4-307917 A | | 10/1992 |
| JP | 8-3156 A | | 1/1996 |
| JP | 11-251191 A | | 9/1999 |
| JP | 3040113 B2 | | 3/2000 |
| JP | 3084330 B2 | | 6/2000 |
| JP | 2000239361 A | * | 9/2000 |
| JP | 2002-260967 A | | 9/2002 |
| JP | 2002-260968 A | | 9/2002 |

* cited by examiner

SOLID ELECTROLYTIC CAPACITOR AND METHOD FOR PRODUCING THE SAME

CROSS-REFERENCE TO RELATED APPLICATION

This is an application based on the prescription of 35 U.S.C. Section 111(a) with claiming the benefit of filing date of U.S. Provisional application Ser. No. 60/430,063 filed Dec. 2, 2002 under the provision of 35 U.S.C. Section 111(b), pursuant to 35 U.S.C. Section 119(e)(1).

TECHNICAL FIELD

The present invention relates to a solid electrolytic capacitor using an electrically conducting polymer as a solid electrolyte layer, and a production method thereof.

BACKGROUND ART

Figure 1:
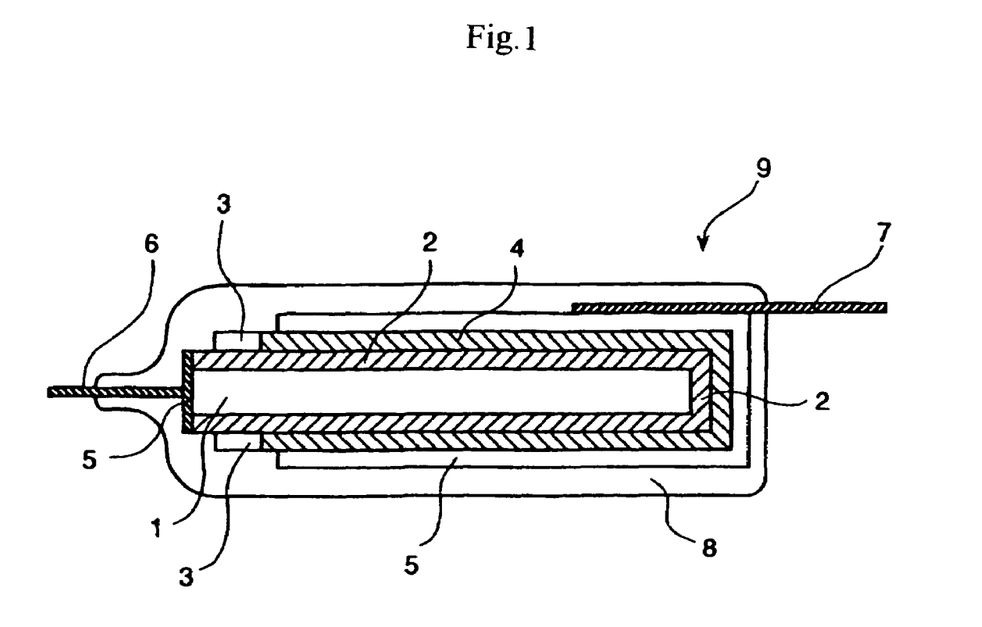
FIG. 1 is a cross-sectional view of a solid electrolytic capacitor using a capacitor element.

A basic element of a solid electrolytic capacitor is generally produced, as shown in FIG. 1, by forming an oxide film layer 2 as a dielectric material on an anode substrate 1 comprising a metal foil having a specific surface area enlarged through etching treatment, forming a solid semiconductor layer (hereinafter referred to as a solid electrolyte) 4 as an opposing electrode in the outer side of the oxide film layer, and if desired, further forming an electrically conducting layer 5 such as electrically conducting paste. To an element thus obtained or elements stacked, lead wires 6 and 7 are joined and the entire is completely molded with an epoxy resin 8 or the like. The thus-produced element is being widely used as a capacitor 9 component for electrical products.

With recent progress on digitization of electric equipment and speeding-up of PC operation, a small-size large-capacitance capacitor and a capacitor having a low impedance in the high frequency region are demanded. Recently, use of an electrically conducting polymer having electron conductivity as a solid electrolyte has been proposed.

As for the shape of solid electrolyte, a technique in which, by welding a metal to an aluminum foil, an electrolytically polymerized conductive polymer is formed all over the surface of an aluminum foil with the metal being as the starting part of polymer growth through electrolytic oxidation has been proposed (see, for example, JP-A-4-307917, (the term "JP-A" as used herein means an "unexamined published Japanese patent application")).

Also, for the purpose of enhancing electrostatic capacitance or reducing the size, aggressive development on technique of enlarging the effective surface area of the anode foil is being made. For example, a technique of etching an aluminum foil and then rolling the etched layer has been proposed (see, for example, Japanese Patent Number 3084330 and JP-A-14-260968).

Furthermore, a small-size and high-density semiconductor package is demanded, and a thin and substrate-contacting solid electrolytic capacitor which is incorporated into a substrate has been proposed (see, for example, JP-A-14-260967).

DISCLOSURE OF INVENTION

In order to obtain a capacitor having a predetermined capacitance, a solid electrolytic capacitor is usually produced by stacking a plurality of capacitor elements, connecting an anode lead wire to the anode terminal, connecting a cathode lead wire to the electrically conducting layer containing an electrically conducting polymer, and sealing the entire with an insulative resin such as an epoxy resin. However, in a solid electrolytic capacitor, if the polymerization conditions are not precisely controlled in the step of attaching an electrically conducting polymer to the cathode part, the thickness of the electrically conducting polymer attached becomes uneven, and the electrically conducting polymer is too thin in some portions, giving rise to problems such that the paste or the like readily comes into direct contact with the oxide dielectric film layer to cause increase in the leakage current. Therefore, it is necessary for the electrically conducting polymer to have a sufficient thickness. Since the number of capacitor elements which can be stacked in a predetermined chip is restricted by the thickness of the element, desirable capacitance of solid electrolytic capacitor has not been achieved. Moreover, if the thickness of the electrically conducting polymer attached is uneven, the contacting area between the stacked capacitor elements becomes small, giving rise to a problem that the equivalent series resistance (ESR) becomes large.

Precise control of polymerization conditions for a long time of period, which is required for obtaining an electrically conducting polymer with a smaller variety in thickness, raises a problem that such a requirement greatly deteriorates the productivity.

Therefore, with a view to solving the above-described problems, the objects of the present invention are, to fabricate a solid electrolytic multilayer capacitor having a high capacitance and a low equivalent series resistance by stably producing thin elements having a smaller variety in shape to increase the number of elements to be stacked inside the capacitor with the time involved for precisely controlling polymer formation being reduced without increasing in short-circuit failure rate, and to provide a production process therefor.

As a result of extensive investigations to attain these objects, the present inventors have found that the shape of the solid electrolyte can be effectively made even by compressing the electrically conducting polymer formed and the thus-obtained solid electrolytic capacitor is enhanced in adhesive property of the solid electrolyte formed on the dielectric film, favored with high capacitance, reduced in the dielectric loss (tan δ), leakage current and defective rate.

It has been also found that by stacking a plurality of the above-described solid electrolytic capacitor elements having excellent properties, a capacitor reduced in the size and elevated in the capacitance can be produced.

That is, the present invention provides the following solid electrolytic capacitors and production method therefor.

1. A solid electrolytic capacitor comprising a capacitor element obtainable by compressing a porous valve-acting metal substrate having on the dielectric film surface thereof a solid electrolyte layer containing an electrically conducting polymer in the thickness direction.

2. The solid electrolytic capacitor as described in 1 above, wherein in the capacitor element, the porous valve-acting metal substrate having on the dielectric film surface thereof a solid electrolyte layer containing an electrically conducting polymer is compressed in the thickness direction and a cathode layer is provided on the solid electrolyte layer.

3. The solid electrolytic capacitor as described in 1 or 2 above, wherein the solid electrolyte containing an electrically conducting polymer to be provided on the dielectric film on the porous valve-acting metal is formed by chemical polymerization or electrochemical polymerization.

4. The solid electrolytic capacitor as described in any one of 1 to 3 above, wherein the thickness of the element having thereon a solid electrolyte layer has a maximum height (Rmax) of 250 μm or less after the compression.

5. The solid electrolytic capacitor as described in 2 above, comprising a capacitor element obtained by compressing a porous valve-acting metal substrate having on the dielectric film surface thereof a solid electrolyte layer containing an electrically conducting polymer in the thickness direction to homogenize the thickness of the electrically conducting polymer layer and then providing a cathode layer on the solid electrolyte layer.

6. The solid electrolytic capacitor as described in any one of 1 to 5 above, wherein, assuming that the maximum thickness and the minimum thickness of the electrically conducting polymer layer including the substrate before the compression are Hamax and Hamin, respectively, and that the maximum thickness and the minimum thickness of the electrically conducting polymer layer including the substrate after the compression are Hbmax and Hbmin, respectively, the percentage decrease ΔH in the difference of thickness represented by the following formula is within a range of 5 to 95%:

$$\Delta H(\%) = \left[1 - \frac{(H b \max - H b \min)}{(H a \max - H a \min)}\right] \times 100.$$

7. The solid electrolytic capacitor as described in any one of 1 to 6 above, wherein the compressibility of the entire substrate having thereon a solid electrolyte layer is from 5 to 90%.

8. The solid electrolytic capacitor as described in any one of 1 to 7 above, wherein the electrically conducting polymer as the solid electrolyte is formed on the valve-acting metal substrate having a dielectric film by solution chemical oxidative polymerization or vapor-phase chemical oxidative polymerization using a monomer of an organic polymer.

9. The solid electrolytic capacitor as described in any one of 1 to 7 above, wherein the electrically conducting polymer as the solid electrolyte is formed by repeating an operation of alternately dipping the valve-acting metal substrate having a dielectric film in a solution containing a monomer of an organic polymer and in a solution containing an oxidizing agent.

10. The solid electrolytic capacitor as described in any one of 1 to 9 above, wherein the porous valve-acting metal substrate has a plate- or foil-like shape.

11. The solid electrolytic capacitor as described in any one of 1 to 10 above, wherein the porous valve-acting metal is a simple metal selected from a group consisting of aluminum, tantalum, niobium, titanium, zirconium, magnesium and silicon, or an alloy thereof.

12. The solid electrolytic capacitor as described in any one of 1 to 11 above, wherein the monomer of the organic polymer for forming the electrically conducting polymer is a compound containing a 5-member heterocyclic ring, or a compound having an aniline skeleton.

13. The solid electrolytic capacitor as described in 12 above, wherein the compound containing a 5-member heterocyclic ring is a compound having a thiophene skeleton or a polycyclic sulfide skeleton.

14. The solid electrolytic capacitor as described in 13 above, wherein the monomer compound having a thiophene skeleton is 3-ethylthiophene, 3-hexylthiophene, 3,4-dimethylthiophene, 3,4-methylenedioxythiophene or 3,4-ethylenedioxythiophene.

15. The solid electrolytic capacitor as described in any one of 1 to 14 above, wherein a part of the solid electrolyte layer formed of the electrically conducting polymer has a lamella structure or a fibril structure.

16. A solid electrolytic multilayer capacitor obtained by stacking a plurality of capacitor elements described in any one of 1 to 15 above.

17. A solid electrolytic multilayer capacitor comprising a capacitor element obtained by stacking a plurality of porous valve-acting metal substrates each having on the dielectric film surface thereof a solid electrolyte layer comprising an electrically conducting polymer resulting from oxidative polymerization of a monomer of an organic polymer with an oxidizing agent, compressing the multilayer substrate in the thickness direction, and providing a cathode layer on the outer surface of the solid electrolyte layer.

18. The solid electrolytic multilayer capacitor as described in 17 above, wherein the compressibility of the entire multilayer substrate having provided thereon solid electrolyte layers is from 5 to 90%.

19. A method for producing a solid electrolytic capacitor, comprising forming a solid electrolyte layer of an electrically conducting polymer on the surface of a porous valve-acting metal substrate having a dielectric film by using a solution containing a monomer for forming an electrically conducting polymer under the action of an oxidizing agent and a solution containing an oxidizing agent, compressing the substrate having provided thereon an electrically conducting polymer in the thickness direction and providing a cathode layer on the solid electrolyte layer.

20. A method for producing a solid electrolytic capacitor, comprising forming a solid electrolyte layer of an electrically conducting polymer on the surface of a porous valve-acting metal substrate having a dielectric film by using a solution containing a monomer for forming an electrically conducting polymer under the action of an oxidizing agent and a solution containing an oxidizing agent, stacking a plurality of substrates each having provided thereon an electrically conducting polymer, compressing the multilayer substrate in the thickness direction and providing a cathode layer on the outer surface of the solid electrolyte layer.

21. A method for producing a solid electrolytic capacitor, comprising forming a solid electrolyte layer of an electrically conducting polymer on the surface of a porous valve-acting metal substrate having a dielectric film by using a solution containing a monomer for forming an electrically conducting polymer under the action of an oxidizing agent and a solution containing an oxidizing agent, compressing the substrate having provided thereon an electrically conducting polymer in the thickness direction, providing a cathode layer on the solid electrolyte layer, and compressing the cathode layer in the thickness direction.

22. The method for producing a solid electrolytic capacitor as described in any one of 19 to 21, wherein the entire substrate having provided thereon a solid electrolyte layer is compressed at a compressibility of 5 to 90%.

23. The method for producing a solid electrolytic capacitor as described in any one of 19 to 21, wherein assuming that the maximum thickness and the minimum thickness of the electrically conducting polymer layer including the substrate before the compression are Hamax and Hamin, respectively, and that the maximum thickness and the minimum thickness of the electrically conducting polymer layer including the substrate after the compression are Hbmax and Hbmin, respectively, the compression is performed such that the percentage decrease ΔH in the difference of thickness represented by the following formula is within a range of 5 to 95%:

$$\Delta H(\%) = \left[1 - \frac{(Hb\max - Hb\min)}{(Ha\max - Ha\min)}\right] \times 100.$$

24. The method for producing a solid electrolytic capacitor as described in any one of 19 to 23 above, which comprises a re-electrochemical formation step after the step of compressing the substrate having provided thereon a solid electrolyte layer in the thickness direction.

25. The method for producing a solid electrolytic capacitor as described in any one of 19 to 23 above, which comprises a humidification aging step after the step of compressing the substrate having provided thereon a solid electrolyte layer in the thickness direction.

26. The method for producing a solid electrolytic capacitor as described in 25 above, wherein the humidification aging step is performed at an electrochemical forming voltage lower than the sparking voltage under the conditions of 20 to 95° C. and 40 to 95% RH.

The method of the present invention is described below by referring to the drawings attached.

The dielectric film 2 on the surface of the substrate 1 for use in the present invention is usually formed, for example, by electrochemically forming a porous shaped article of a valve-acting metal.

The electrochemical forming conditions such as electrochemical forming solution and electrochemical forming voltage for use in the electrochemical formation are adjusted to appropriate conditions which have been confirmed through experiments performed in advance, according to the capacitance, breakdown voltage and the like required for the solid electrolytic capacitor to be produced. In the electrochemical formation, the masking 3 is generally provided so as to prevent the electrochemical forming solution from soaking up to the portion which is predetermined to be the anode of the solid electrolytic capacitor and at the same time, the masking ensures the insulation from the solid electrolyte 4 (cathode portion) which is formed in a later step.

The masking material is not limited but, for example, a general heat-resistant resin, preferably a solvent-soluble or solvent-swellable heat-resistant resin, a precursor thereof or a composition comprising an inorganic fine powder and a cellulose-base resin, may be used. Specific examples thereof include polyphenylsulfone (PPS), polyethersulfone (PES), cyanic ester resin, fluororesin (e.g., tetrafluoroethylene, tetrafluoroethylene-perfluoroalkyl vinyl ether copolymer), low molecular polyimide, and derivatives and precursors thereof. Among these, low molecular polyimide, polyether sulfone, fluororesin, and precursors thereof are preferred.

In general, examples of methods for forming an electrically conducting polymer on an oxide dielectric film include a method of forming an electrically conducting polymer layer by vapor phase polymerization or electrolytic polymerization (see, JP-A-3-6217), a solution chemical polymerization method of adhering a monomer of an organic polymer on the oxide dielectric film and polymerizing the monomer in an oxidizing agent solution (see, JP-A-11-251191), and an electrochemical polymerization method where the point of feeding electricity to the anode body is shifted at predetermined time intervals by using a switching device to thereby obtain a uniform thickness of the electrically conducting polymer layer (see, U.S. Pat. Nos. 6,168,639 and 6,313,979). In the present invention, solution chemical oxidative polymerization of a monomer of an organic polymer, containing steps of dipping a porous valve-acting metal substrate in an oxidizing agent solution and drying it to gradually increase the concentration of the oxidizing agent solution on the substrate, or vapor phase chemical oxidative polymerization is preferably used. In particular, solution chemical oxidative polymerization is more preferred.

According to the present invention, as shown in Examples later described, an aluminum foil having an oxide dielectric film is dipped, for example, in an isopropyl alcohol (IPA) solution of 3,4-ethylenedioxythiophene (EDT), air-dried to mostly remove the IPA, and dipped in an aqueous solution, containing about 20 mass % of an oxidizing agent (ammonium persulfate). Then, by heating at about 40° C. for 10 minutes or by repeating the process, the polymer of poly(3,4-ethylenedioxythiophene) can be obtained.

The solid electrolyte layer of an electrically conducting polymer formed by the method of the present invention has a fibril structure or a lamella (thin layer-like) structure. Widespread overlapping among the polymer chains in these structures, which facilitates hopping of electrons, is considered to contribute to improvement in the electric conductivity and in properties such as low impedance.

In the solution chemical polymerization method, a monomer is attached onto a dielectric film having microfine pores on an anode substrate, oxidative polymerization thereof is induced under the action of an oxidizing agent and moisture in air in the presence of a compound which can work out to a dopant of the electrically conducting polymer, and the polymer composition produced on the dielectric surface forms a solid electrolyte. At this time, for forming a good polymer composition, the dipping time (impregnation time) in each of the monomer-containing solution and the oxidizing agent-containing solution must be adjusted to control the amount of the monomer attached and the amount of the oxidizing agent attached. For example, if the dipping time is too long, the polymerization reaction cannot be completed and the polymer composition obtained is liable to have a low molecular weight. Also, if the dipping time in the oxidizing agent-containing solution having an unsaturated concentration is too long, the oxidizing agent which has been attached to the metal foil substrate through previous steps including the drying step re-dissolves and at the same time, the monomer attached or the polymer produced is also eluted or flows out, as a result, not only the production of the polymer is retarded but also the oxidizing agent-containing solution is contaminated with the effluent. The same may occur in the case of dipping in the monomer-containing solution.

With respect to the phenomenon which may be brought about, there may occur, for example, coloration of the oxidizing agent-containing solution or monomer-containing solution due to low molecular weight components, suspension of the polymerized material, tendency toward the reduction in the weight of the adhered and formed solid electrolyte, and change in the viscosity or specific gravity of the monomer-containing solution.

Accordingly, in the method of the present invention, the dipping time in each of the monomer-containing solution and the oxidizing agent-containing solution is from a time sufficiently long to allow the monomer component or oxidizing agent component in the solution containing the component to adhere to the dielectric surface of the metal foil substrate to a time period less than 15 minutes, preferably from 0.1 second to 10 minutes, more preferably from 1 second to 7 minutes.

After the impregnation in the monomer-containing solution, the substrate must be left standing in air for a predetermined time to vaporize the solvent and thereby uniformly attach the monomer to the dielectric surface and to the polymer composition. The conditions therefor vary depending on the kind of solvent but generally, the standing temperature is from 0° C. to the boiling point of the solvent and the standing time is from 5 seconds to 15 minutes. For example, in the case of an alcohol-type solvent, standing for 5 minutes or less may be sufficient. With this standing time, the monomer can uniformly adhere to the dielectric surface and at the subsequent dipping in the oxidizing agent-containing solution, the contamination can be reduced.

After the dipping in the monomer-containing solution and in the oxidizing agent-containing solution, the substrate is held in an air at a constant temperature for a predetermined time to allow the oxidative polymerization of the monomer to proceed.

The polymerization temperature varies depending on the kind of the monomer, however, for example, in the case of pyrrole, the polymerization temperature is 5° C. or less and in the case of a thiophene-type monomer, from about 30 to 60° C.

The polymerization time depends on the amount of the monomer to be attached at the dipping. The amount of the monomer attached varies depending on the concentration, viscosity or the like of the monomer-containing solution and the oxidizing agent-containing solution and cannot be indiscriminately specified, however, in general, when the amount of the monomer attached per once is small, the polymerization time can be short, whereas when the amount of the monomer attached per once is large, the polymerization takes a long time.

In the method of the present invention, the polymerization time per once is from 10 seconds to 30 minutes, preferably from 3 to 15 minutes.

The electrically conducting polymer layer formed on the dielectric film by the method of the present invention is confirmed to have a lamella structure or a fibril structure by an electron microphotograph.

The lamella structure and the fibril structure of the electrically conducting polymer are considered to contribute to improvement of the one-dimensional property of the polymer chain, which is a factor of elevating the electric conductivity, and also to the widespread overlapping among polymer chains, thereby giving preferred effects on the elevation of electrical conductivity of the polymer solid electrolyte and on the improvement of capacitor properties, such as realization of low impedance.

In the method of the present invention, the number of dipping operations must be controlled so that the electrically conducting polymer compound can be formed to a thickness large enough to ensure the resistance against moisture, heat, stress and the like. A desired solid electrolyte layer can be easily formed by repeating the above-described production process 5 times or more, preferably from 8 to 30 times, per one anode substrate.

The step of forming a solid electrolyte for use in a solid electrolytic capacitor is a step of alternately dipping the anode body obtained by forming a dielectric film on a valve acting metal, in the monomer-containing solution and in the oxidizing agent-containing solution and drying it repeatedly to alternately attach the monomer and the oxidizing agent to the anode body and allow the chemical oxidation polymerization to proceed in air.

The temperature in the atmosphere varies depending on the kind and polymerization method of the polymer composition and cannot be indiscriminately specified but in general, the temperature is preferably in the range from −70° C. to 250° C.

The concentration of the monomer-containing solution is from 3 to 50 mass %, preferably from 5 to 35 mass %, more preferably from 10 to 25 mass %, and the concentration of the oxidizing agent-containing solution is from 5 to 70 mass %, preferably from 15 to 50 mass %. The viscosity of each of the monomer-containing solution and the oxidizing agent-containing solution is 100 cP (centipoise) or less, preferably 30 cP or less, more preferably from 0.6 to 10 cP.

According to the present invention, the solid electrolyte of an electrically conducting polymer having a layer structure (lamella structure or fibril structure) can be formed by the alternate dipping in the monomer-containing solution and in the oxidizing agent-containing solution. However, in order to further improve the one-dimensional property of the polymer chain in this layer and generate more overlapping among the polymer chains, it has been found preferable not to perform the washing every each polymerization but perform the washing at the final stage. By doing so, the excess (unreacted) monomer remaining unreacted in one polymerization step can be polymerized in the subsequent step, as a result, a solid electrolyte comprising an electrically conducting polymer having a layer structure favored with widespread overlapping among polymer chains can be formed.

In one preferred embodiment of the present invention, the process of forming a solid electrolyte includes a step of dipping the valve-acting metal anode foil having formed thereon the above-described dielectric film layer in a solution containing an oxidizing agent (Solution 1) and a step of dipping it in a solution containing a monomer and a dopant (Solution 2). With respect to the order of dipping operations, an order of dipping the valve-acting metal anode foil in Solution 1 and then dipping it in Solution 2 (regular order) may be used or a reversed order of dipping the valve-acting metal anode foil in Solution 2 and then dipping it in Solution 1 may also be used.

In another embodiment, the process may include a step of dipping the anode foil in a solution containing an oxidizing agent and a dopant (Solution 3) and a step of dipping it in a solution containing a monomer (Solution 4). Also in this case, an order of dipping the anode foil in Solution 3 and then dipping it in Solution 4 (regular order) or a reversed order of dipping the anode foil in Solution 4 and then dipping it in Solution 3 may be used. Solutions 1 to 4 each may be used in the suspension state. Furthermore, the dipping may be replaced by coating.

The solvents in Solutions 1 to 4 may be the same, if desired, or different solvent systems may be used. Depending on the kind of solvent, a drying step may be separately interposed between dipping steps of Solution 1 and solution 2 or between dipping steps of Solution 3 and Solution 4. Furthermore, washing with a solvent may be performed after the formation of the solid electrolyte.

The valve-acting metal which can be used in the present invention is a simple metal such as aluminum, tantalum, niobium, titanium, zirconium, magnesium and silicon, or an alloy thereof. The metal may have any shape as long as it is in the form of a porous shaped article such as an etched product of rolled foil or a sintered body of fine powder.

For the anode substrate, a porous sintered body of the above-described metal, a plate (including ribbon, foil and the like), a wire and the like which are surface-treated by etching and the like, may be used, however, a plate and a foil are preferred. A known method may be used for forming an oxide dielectric film on the surface of this metal porous body. For example, in the case of using a sintered body of tantalum powder, the oxide film may be formed on the sintered body by the anodization in an aqueous phosphoric acid solution.

The thickness of the valve-acting metal foil varies depending on the use end, however, a foil having a thickness of about 40 to 300 µm is used. In order to produce a thin solid electrolytic capacitor, for example, in the case of an aluminum foil, it is preferred to use an aluminum foil having a thickness of 80 to 250 µm and adjust the element having a solid electrolyte thereon to have a maximum height (Rmax) of 250 µm or less after compression. The size and the shape of the metal foil also vary depending on the use end, however, the metal foil as a plate-like element unit preferably has a rectangular form having a width of about 1 to about 50 mm and a length of about 1 to about 50 mm, more preferably a width of about 2 to about 15 mm and a length of about 2 to about 25 mm.

Examples of the aqueous solution-type oxidizing agent which can be used for the formation of the solid electrolyte in the present invention include peroxodisulfuric acid and Na, K and $NH_4$ salts thereof, cerium(IV) nitrate, ammonium cerium(IV) nitrate, iron(III) sulfate, iron(III) nitrate and iron(III) chloride. Examples of the organic solvent-type oxidizing agent include ferric salts of an organic sulfonic acid, such as iron(III) dodecylbenzenesulfonate and iron(III) p-toluenesulfonate. Examples of the organic solvent used here include γ-butyrdlactone and monohydric alcohols such as butanol and isopropanol. The concentration of the oxidizing agent solution is preferably from 5 to 50 mass % and the temperature of the oxidizing agent solution is preferably from −15 to 60° C.

The electrically conducting polymer constituting the solid electrolyte for use in the present invention is a polymer of an organic high molecular monomer having a π electron-conjugate structure and the polymerization degree thereof is from 2 to 2,000, more preferably from 3 to 1,000, still more preferably from 5 to 200. Specific examples thereof include electrically conducting polymers containing, as a repeating unit, a structure shown by a compound having a thiophene skeleton, a compound having a polycyclic sulfide skeleton, a compound having a pyrrole skeleton, a compound having a furan skeleton or a compound having an aniline skeleton, however, the electrically conducting polymer is not limited thereto.

Examples of the monomer compound having a thiophene skeleton include derivatives such as 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylenethiophene, 3,4-methylenedioxythiophene and 3,4-ethylenedioxythiophene. These compounds are generally available on the market or may be prepared by a known method (a method described, for example, in *Synthetic Metals*, Vol. 15, page 169 (1986)), however, the present invention is not limited thereto.

Specific examples of the monomer compound having a polycyclic sulfide skeleton include compounds having a 1,3-dihydro-polycyclic sulfide (also called 1,3-dihydrobenzo-[c]thiophene) skeleton and compounds having a 1,3-dihydronaphtho[2,3-c]thiophene skeleton. Furthermore, compounds having a 1,3-dihydroanthra[2,3-c]thiophene skeleton and compounds having a 1,3-dihydronaphthaceno[2,3-c]thiophene skeleton may be used. These compounds may be prepared by a known method, for example, by the method described in JP-A-8-3156.

In addition, compounds having a 1,3-dihydronaphtho[1,2-c]thiophene skeleton such as 1,3-dihydrophenanthra[2,3-c]thiophene derivatives, and compounds having a 1,3-dihydrotriphenylo[2,3-c]thiophene skeleton such as 1,3-dihydrobenzo[a]anthraceno[7,8-c]thiophene derivatives, may also be used.

A compound arbitrarily containing nitrogen or N-oxide in the condensed ring may also be used and examples thereof include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide, however, the present invention is not limited thereto.

Examples of the monomer compound having a pyrrole skeleton include derivatives such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole. These compounds are commercially available or may be prepared by a known method, however the present invention is not limited thereto.

Examples of the monomer compound having a furan skeleton include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran. These compounds are commercially available or may be prepared by a known method, however the present invention is not limited thereto.

Examples of the monomer compound having an aniline skeleton include derivatives such as 2-methylaniline, 2-ethylaniline, 2-propylaniline, 2-butylaniline, 2-pentylaniline, 2-hexylaniline, 2-heptylaniline, 2-octylaniline, 2-nonylanilin, 2-decylaniline, 2-fluoroaniline, 2-chloroaniline, 2-bromoaniline, 2-cyanoaniline, 2,5-dimethylaniline, 2,5-diethylaniline, 2,3-butyleneaniline, 2,3-methylenedioxyaniline and 2,3-ethylenedioxyaniline. These compounds are commercially available or may be prepared by a known method, however, the present invention is not limited thereto.

Among these, the compounds having a thiophene skeleton or a polycyclic sulfide skeleton are preferred, and 3,4-ethylenedioxythiophene (EDT) and 1,3-dihydroisothianaphthene are more preferred.

The solvent for the monomer of an organic polymer is preferably a monohydric alcohol (e.g., methyl alcohol, ethyl alcohol, n-propyl alcohol, isopropyl alcohol, n-butyl alcohol, isobutyl alcohol, tert-butyl alcohol). The monomer concentration in the monomer solution is not particularly limited and any concentration may be used.

The conditions for the polymerization of the compound selected from the group consisting of the above-described compounds are not particularly limited and the polymerization may be easily performed after previously confirming the preferred conditions by a simple experiment.

The solid electrolyte may be formed as a copolymer by using the compounds selected from the group consisting of the above-described compounds in combination. In this case, the compositional ratio and the like of polymerizable monomers depend on the polymerization conditions and the preferred compositional ratio and polymerization conditions may be confirmed by a simple experiment.

For example, a method where an EDT monomer and an oxidizing agent each preferably in the form of a solution are coated separately one after another or coated simultaneously on an oxide film layer of a metal foil to form a solid electrolyte (see, Japanese Patent No. 3,040,113 and U.S. Pat. No. 6,229,689), may be used.

3,4-Ethylenedioxythiophene (EDT) which is preferably used in the present invention is well soluble in the above-described monohydric alcohol but low in the affinity for water, therefore, when EDT is contacted with an aqueous oxidizing agent solution of high concentration, the polymerization of EDT aggressively proceeds on the interface thereof and a solid electrolyte layer of electrically conducting polymer with a fibril structure or a lamella (thin layer-like) structure is formed.

Examples of the solvent for the solutions used in the production method of the present invention and the solvent for washing after the formation of the solid electrolyte include ethers such as tetrahydrofuran (THF), dioxane and diethylether; ketones such as acetone and methyl ethyl ketone; aprotic polar solvents such as dimethylformamide, acetonitrile, benzonitrile, N-methylpyrrolidone (NMP) and dimethylsulfoxide (DMSO); esters such as ethyl acetate and butyl acetate; non-aromatic chlorine-based solvents such as chloroform and methylene chloride; nitro compounds such as nitromethane, nitroethane and nitrobenzene; alcohols such as methanol, ethanol and propanol; organic acids such as formic acid, acetic acid and propionic acid; acid anhydrides of the organic acid (e.g., acetic anhydride); water; and mixed solvents thereof. Among these, preferred are water, alcohols, ketones and mixed systems thereof.

In forming the electrically conducting polymer for use in the present invention, an arylsulfonic acid-based dopant is used. Examples of the starting material for dopant, which can be used, include salts of benzenesulfonic acid, toluenesulfonic acid, naphthalenesulfonic acid, anthracenesulfonic acid, anthraquinonesulfonic acid and the like.

The thus-produced solid electrolyte has an electric conductivity of about 0.1 to about 200 S/cm, preferably from about 1 to about 150 S/cm, more preferably from about 10 to about 100 S/cm.

Figure 2:
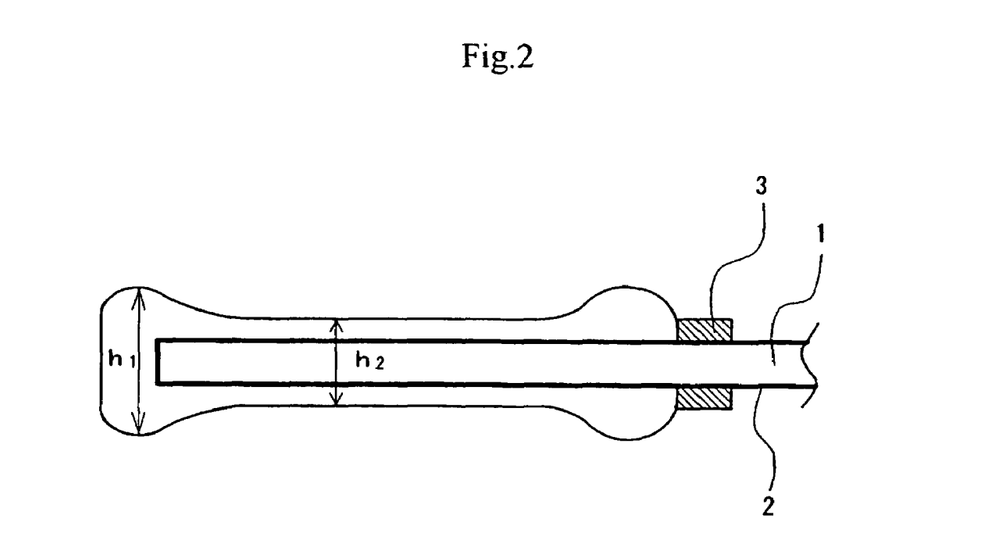
FIG. 2 is a schematic longitudinal cross-sectional view of the capacitor element part of Example 1.

In the present invention, the substrate having formed thereon an electrically conducting polymer composition layer grown in the longitudinal (thickness) direction by the oxidative polymerization is used after compressing it. By this compression, in the substrate schematically shown in FIG. 2, the difference [$h_1-h_2$] between the maximum thickness ($h_1$) and the minimum thickness ($h_2$) of the solid electrolyte layer becomes small and at the same time, the substrate itself and electrically conducting polymer are also compressed to become thinner, as a result, capacitor elements can be stably prepared with a small variety of shape and capacitance.

Compression may be performed on a single capacitor element substrate having formed thereon an electrically conducting polymer composition layer or on the outermost layer of a laminate body of a plurality of capacitor element substrates in the process of producing a multilayer capacitor.

The compression may be performed by superimposing and pressing the substrate having formed thereon an electrically conducting polymer composition layer on a flat plate. The compression conditions may be sufficient if these are within the range of not affecting the capacitor properties. The substrate itself may be deformed by the compression.

More specifically, assuming that the maximum thickness and the minimum thickness of the electrically conducting polymer layer including the substrate before the compression are Hamax and Hamin, respectively, and that the maximum thickness and the minimum thickness of the electrically conducting polymer layer including the substrate after the compression are Hbmax and Hbmin, respectively, the compression is performed such that the percentage decrease ΔH in the difference of thickness represented by the following formula falls within a range of 5 to 95%.

$$\Delta H(\%) = \left[1 - \frac{(Hb\max - Hb\min)}{(Ha\max - Ha\min)}\right] \times 100.$$

The compressibility of the entire substrate (including both a single plate element and a multilayer plate element) having provided thereon a solid electrolyte layer is from 5 to 90%, preferably from 10 to 85%, more preferably from 15 to 80%.

The electric conductivity is about 0.1 to about 200 S/cm, preferably from about 1 to about 150 S/cm, more preferably from about 10 to about 100 S/cm.

The material of the flat plate for shaping used at the compression is not particularly specified, however, a metal plate or material having elasticity, for example, a plastic plate may be used. In this case, the flat plate itself may undergo elastic or plastic deformation at the compression and the substrate may be embraced by the elastic body, however, this causes no problem as far as the substrate having formed thereon an electrically conducting polymer composition layer is compressed to be thin. The substrate having formed thereon an electrically conducting polymer composition layer may be compressed after previously stacking a plurality of substrates or the compression may be repeated.

The pressure required for the compression is from 0.05 to 20 kg/mm$^2$, preferably from 0.1 to 10 kg/mm$^2$, more preferably from 0.1 to 2 kg/mm$^2$. In the case where the minimum thickness of the element after compression is limited, the distance between each flat plate for compression may be controlled.

The retention time for the compression is from 0.01 seconds to 5 minutes, preferably from 0.1 seconds to 30 seconds, more preferably from 0.1 seconds to 10 seconds.

Immediately before the compression, the element may be heated to a temperature less than 200° C. or the flat plate may be heated to a temperature less than 230° C., or both of the element and the flat plate may also be heated.

In the compression step, a release agent may be used if appropriate for preventing the element from adhering to the flat plate. For example, water, an organic solvent which does not adversely affect to cause the cathode layer comprising an electrically conducting polymer to dissolve or decompose and whose boiling point is lower than 100° C., or a surfactant which is removable in a later step may be used.

Also, the element may be prevented from adhering to the flat plate by surface-treating the flat plate with plating, artificial diamond coating, Teflon coating and the like.

When the dielectric film is flawed during the compression process, it can be recovered by conducting the re-electrochemical formation or aging after compression.

Through the above steps, a thin capacitor element having a uniform thickness can be prepared, and therefore element density in a predetermined-size capacitor case can be increased to break through the conventional upper limit of capacitance.

Furthermore, the capacitor element can be made thin and single-plate capacitor comprising such an element can be employed as a capacitor to be placed in close contact with a circuit board.

According to the present invention, the solid electrolyte, covering the outer surface of the anode body and having a lamella or fibril structure, include continuous or independent spaces. Such spaces become smaller only in volume during the compression step, so that the density of the solid electrolyte is increased while the lamella or fibril structure of solid electrolyte is maintained. Therefore, even if the thickness of the solid electrolyte becomes thin, its function to ease impacts such as thermal stress or mechanical stress imposed during in the steps for producing capacitor, such as molding step, does not change. This useful structure can cope with various stresses imposed not only in the production process but also from the environment where the capacitor is actually used.

In the case where re-electrochemical formation is necessary, the re-electrochemical formation conditions such as electrochemical forming voltage may be the same as in the electrochemical formation, including the electrochemical forming solution. The electrochemical forming solution is preferably a neutral salt such as ammonium adipate but may be a phosphate. The re-electrochemical formation for recovery may be performed as a step before fabricating a capacitor chip and may be performed every time when the element is damaged or all damages may be recovered at a time.

Also, humidification aging for recovering the damaged element where a voltage is applied to the capacitor element or a capacitor chip in the atmosphere may be employed. Specifically, after an element or a capacitor chip is left standing under conditions of a temperature of 20 to 95° C. and a humidity of 40 to 95% RH for 5 minutes to 100 hours, a voltage within 0.5 times of a rated voltage to a highest voltage nbt destroying the capacitor may be applied under the atmosphere of room temperature to 230° C. Alternatively, a voltage from 0.5 times of the rated voltage to a highest voltage not destroying the capacitor may be applied in the atomosphere under the condition of 20 to 95° C. and 40 to 95% RH.

When the damage by the compression is small, these recovery steps are substantially unnecessary.

On the thus-formed electrically conducting polymer composition layer, an electrically conducting layer is preferably provided so as to attain good electric contact with the cathode lead terminal. For example, an electrically conducting paste is solidified, a metal is plated or deposited, or an electrically conducting resin film is formed to work out to electrically conducting layer.

In the present invention, the compression may be performed after the electrically conducting layer is formed. This is particularly effective. For example, in the case of an electrically conducting layer containing an elastic body, plastic deformation occurs by the compression, to further reduce the thickness and an effect of smoothing the electrically conducting layer surface is also provided.

The thus-obtained solid electrolytic capacitor element is usually connected with a lead terminal and then a jacket is applied to the element by using resin molding, a resin case, a metal-made jacket case, resin dipping or the like, thereby completing a capacitor product for various uses.

BEST MODE FOR CARRYING OUT THE INVENTION

The present invention is described in detail below by referring to representative Examples, however, these are given for merely illustrating the invention and the present invention is not limited thereto.

EXAMPLE 1

A formed aluminum foil (thickness: 100 μm) was cut into a size of 3 mm (short axis direction)×10 mm (long axis direction) and a polyimide solution was circumferentially coated on both surfaces to a width of 1 mm to section the surface area into a 4-mm portion and a 5-mm portion in the long axis direction, and then dried to form a masking. The 3 mm×4 mm portion of this formed foil was electrochemically formed with an aqueous 10 mass % ammonium adipate solution by applying a voltage of 4 V to form an oxide dielectric film on the cut end part. Thereafter, this 3 mm×4 mm portion of the aluminum foil was dipped in 1.2 mol/L of an isopropyl alcohol (IPA) solution having dissolved therein 3,4-ethylenedioxythiophene for 5 seconds, dried at room temperature for 5 minutes, and then dipped for 5 seconds in 2 mol/L of an aqueous ammonium persulfate solution containing sodium 2-anthraquinonesulfonate adjusted to a concentration of 0.07 mass %. Subsequently, this aluminum foil was left standing in an air at 40° C. for 10 minutes, thereby performing the oxidative polymerization. By repeating the dipping step and the polymerization step 25 times in total, a solid electrolyte layer of an electrically conducting polymer was formed on the outer surface of the aluminum foil. The finally produced poly(3,4-ethylenedioxythiophene) was washed with warm water at 50° C. and then dried at 100° C. for 30 minutes to complete the formation of the solid electrolyte layer.

Using a thickness gauge (manufactured by Peacock Corp.: Digital Indicator DG-205 (accuracy of 3 μm)), the thickness was measured by slowly putting the aluminum foil into the measuring part of the thickness gauge. As a result, the largest thickness ($h_1$) shown in the schematic view of FIG. 2 was 260 μm, the smallest thickness ($h_2$) was 210 μm, and the difference ($h_1-h_2$) in the film thickness was 50 μm.

After this measurement of thickness, the aluminum foil in the portion where the electrically conducting polymer composition layer was formed was compression-molded at the pressure of 1.5 kg/mm² in a metal mold with a minimum clearance of 140 μm. Then, the thickness was measured in the same manner. As a result, the maximum thickness ($h_1$) shown in the schematic view of FIG. 2 was 180 μm, the minimum thickness ($h_2$) was 170 μm, and the difference ($h_1-h_2$) in the film thickness was 10 μm. The percentage decrease (ΔH) in the difference of thickness of the solid electrolyte layer after compression was 80% and the compressibility ratio was approximately 30%.

After that, the 3 mm×4 mm portion having a solid electrolyte layer formed thereon and provided with an anode-connecting point in the portion having no solid electrolyte formed thereon was dipped in a 15 mass % ammonium adipate, and then applied a voltage of 3.8V to perform a re-electrochemical formation.

Figure 3:
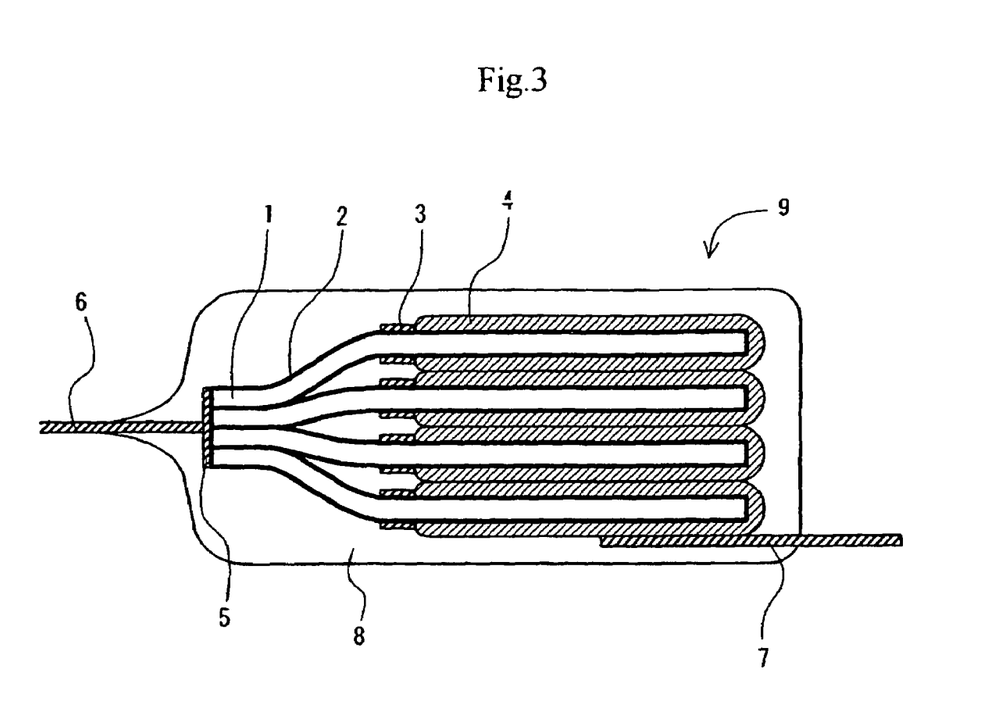
FIG. 3 is a cross-sectional view of a solid electrolytic capacitor obtained by stacking capacitor elements.

Then, as shown in FIG. 3, carbon paste and silver paste were applied to the aluminum foil in the portion where the electrically conducting polymer composition layer was formed. Four sheets of the thus-prepared aluminum foils were stacked and a cathode lead terminal was connected thereto. To the portion where the electrically conducting polymer was not formed, an anode lead terminal was connected by welding. The resulting element was molded with an epoxy resin and aged at 125° C. for 2 hours by applying thereto a rated voltage (2V) In this way, 30 units in total of capacitors were fabricated.

These 30 units of capacitor elements were measured on the initial properties, that is, capacitance and loss factor (tan δ×100%) at 120 Hz, equivalent series resistance (ESR) and leakage current. The leakage current was measured one minute after the rated voltage was applied. In Table 1, respective averages of these measured values, the rate of defective units having a leakage current of 0.002 CV or more are shown. The average of the leakage current values is a value calculated exclusive of such defective units.

EXAMPLES 2(1) TO 2(3)

A solid electrolyte was formed under the same production conditions as in Example 1 and subjected to various combinations of compression and stacking.

EXAMPLE 2(1)

A capacitor element was fabricated in the same manner as in Example 1 except that each of the formed aluminum foil substrate having thereon a solid electrolyte was compressed in the thickness direction after carbon paste and silver paste were attached on the surface, four of thus obtained aluminum foils were stacked and a cathode lead terminal was connected thereto.

EXAMPLE 2(2)

A capacitor element was fabricated in the same manner as in Example 1 except that the substrate having provided thereon a solid electrolyte was compressed in the thickness direction, four of thus obtained capacitor elements were stacked, the stacked body was compressed in the thickness direction, carbon paste and silver paste were attached thereon and a cathode lead terminal was connected thereto.

EXAMPLE 2(3)

A capacitor element was fabricated in the same manner as in Example 1 except that four substrates each having provided thereon a solid electrolyte were stacked, the stacked body was compressed in the thickness direction, carbon paste and silver paste were attached thereon and a cathode lead terminal was connected thereto.

The obtained capacitors were evaluated on the properties in the same manner as in Example 1 and the results are shown in Table 1.

EXAMPLE 3

30 Units of capacitors were fabricated in the same manner as in Example 1 except that pyrrole was used in place of 3,4-ethylenedioxythiophene, the pyrrole solution was dried at 3° C. for 5 minutes after the impregnation, and polymerization was performed at 5° C. for 10 minutes after impregnation in an oxidizing agent solution.

The maximum thickness ($h_1$) of the solid electrolyte layer was measured in the same manner as in Example 1 and found to be 290 μm, the minimum thickness ($h_2$) was 230 μm, and the difference ($h_1-h_2$) in the film thickness was 60 μm. After the subsequent compression, the maximum thickness ($h_1$) was 200 μm, the minimum thickness ($h_2$) was 180 μm, and the difference ($h_1-h_2$) in the film thickness was 20 μm. The percentage decrease (ΔH) in the difference of thickness of the solid electrolyte layer after compression was 66.7%.

The obtained capacitor elements were evaluated on the properties in the same manner as in Example 1 and the results are shown in Table 1.

COMPARATIVE EXAMPLE 1

30 Units of capacitors were fabricated in the same manner as in Example 1 except that the capacitor element produced was used without compression-molding.

The maximum thickness ($h_1$) of the solid electrolyte layer was measured in the same manner as in Example 1 and found to be 260 μm, the minimum thickness ($h_2$) was 210 μm, and the difference ($h_1-h_2$) in the film thickness was 50 μm.

The obtained capacitor elements were evaluated on the properties in the same manner as in Example 1 and the results are shown in Table 1.

COMPARATIVE EXAMPLE 2

30 Units of capacitor elements were fabricated in the same manner as in Example 1 except that the capacitor element produced by performing polymerization 15 times was used without compression.

The maximum thickness ($h_1$) of the solid electrolyte layer was measured in the same manner as in Example 1 and found to be 180 μm, the minimum thickness ($h_2$) was 120 μm, and the difference ($h_1-h_2$) in the film thickness was 60 μm.

The obtained capacitor elements were evaluated on the properties in the same manner as in Example 1 and the results are shown in Table 1.

TABLE 1

| Example | Initial Properties | | | | |
| --- | --- | --- | --- | --- | --- |
| | Capacitance μF | Loss Factor % | ESR Ω | Leakage Current μA | Defective Rate |
| 1 | 109 | 0.7 | 0.007 | 0.03 | 0/30 |
| 2 (1) | 108 | 0.9 | 0.008 | 0.06 | 0/30 |
| 2 (2) | 109 | 1.6 | 0.017 | 0.03 | 0/30 |
| 2 (3) | 110 | 1.8 | 0.018 | 0.04 | 0/30 |
| 3 | 105 | 1.7 | 0.014 | 0.09 | 1/30 |
| Comparative Example 1 | 108* | 3.6 | 0.025 | 0.05 | 1/30 |
| Comparative Example 2 | 107 | 1.9 | 0.020 | 0.15 | 7/30 |

*Not molded (Element(s) partially protruding out disturbed the molding.)

It is seen from the results of Examples 1 to 3 and Comparative Example 1 and 2 that the solid electrolytic capacitor is excellent in that, by extremely reducing the thickness difference (ΔH) through compression of the solid electrolyte layer, the capacitor can obtain properties such as a high capacitance and a low ESR and is reduced in the leakage current and defective ratio.

EXAMPLE 4

Two sheets of substrates each obtained by forming an electrically conducting composition layer on an aluminum foil were stacked, the portion where the electrically conducting polymer composition layer was formed was compression-molded, and the thickness was measured in the same manner as in Example 1. As a result, the maximum thickness ($h_1$) of the solid electrolyte layer in the element where 2 substrates were stacked was 430 μm, the minimum thickness ($h_2$) was 400 μm, and the difference ($h_1-h_2$) in the film thickness was 30 μm.

EXAMPLE 5

After two sheets of substrates each obtained by forming an electrically conducting polymer composition layer on an aluminum foil were stacked, another two sheets of substrates whose portion having an electrically conducting polymer composition layer had been compression-molded were superposed thereon and further compression-molded to prepare an element where 4 substrates were stacked. The thickness of the solid electrolyte layer in this element was measured in the same manner as in Example 1, as a result, the maximum thickness ($h_1$) of the solid electrolyte layer was 780 μm, the thickness minimum ($h_2$) was 760 μm, and the difference ($h_1-h_2$) in the film thickness was 20 μm.

INDUSTRIAL APPLICABILITY

The solid electrolytic multilayer capacitor of the present invention, which uses a thin capacitor element stably prepared with a small variety in shape through a process where a solid electrolyte comprising an electrically conducting polymer of an organic polymer is provided on the dielectric film surface of a porous valve-acting metal substrate and the substrate is compressed in the thickness direction, has a high-capacitance, small-size with low height, and a stable performance without short-circuit failure.

The invention claimed is:

1. A solid electrolytic capacitor comprising a capacitor element obtainable by compressing a porous valve-acting metal substrate having on the dielectric film surface thereof a solid electrolyte layer containing an electrically conducting polymer in the thickness direction and re-electrochemical formation after the compressing step.

2. The solid electrolytic capacitor as claimed in claim 1, wherein in the capacitor element, the porous valve-acting metal substrate having on the dielectric film surface thereof a solid electrolyte layer containing an electrically conducting polymer is compressed in the thickness direction and a cathode layer is provided on the solid electrolyte layer.

3. The solid electrolytic capacitor as claimed in claim 2, comprising a capacitor element obtained by compressing a porous valve-acting metal substrate having on the dielectric film surface thereof a solid electrolyte layer containing an electrically conducting polymer in the thickness direction to homogenize the thickness of the electrically conducting polymer layer and then providing a cathode layer on the solid electrolyte layer.

4. The solid electrolytic capacitor as claimed in claim 1, wherein the solid electrolyte containing an electrically conducting polymer to be provided on the dielectric film on the porous valve-acting metal is formed by chemical polymerization or electrochemical polymerization.

5. The solid electrolytic capacitor as claimed in claim 1, wherein the thickness of the element having thereon a solid electrolyte layer has a maximum height (Rmax) of 250 μm or less after the compression.

6. The solid electrolytic capacitor as claimed in claim 1, wherein, assuming that the maximum thickness and the minimum thickness of the electrically conducting polymer layer including the substrate before the compression are Hamax and Hamin, respectively, and that the maximum thickness and the minimum thickness of the electrically conducting polymer layer including the substrate after the compression are Hbmax and Hbmin, respectively, the percentage decrease AH in the difference of thickness represented by the following formula is within a range of 5 to 95%:

$$\Delta H(\%) = \left[1 - \frac{(Hb\max - Hb\min)}{(Ha\max - Ha\min)}\right] \times 100.$$

7. The solid electrolytic capacitor as claimed in claim 1, wherein the compressibility of the entire substrate having thereon a solid electrolyte layer is from 5 to 90%.

8. The solid electrolytic capacitor as claimed in claim 1, wherein the electrically conducting polymer as the solid electrolyte is formed on the valve-acting metal substrate having a dielectric film by solution chemical oxidative polymerization or vapor-phase chemical oxidative polymerization using a monomer of an organic polymer.

9. The solid electrolytic capacitor as claimed in claim 1, wherein the electrically conducting polymer as the solid electrolyte is formed by repeating an operation of alternately dipping the valve-acting metal substrate having a dielectric film in a solution containing a monomer of an organic polymer and in a solution containing an oxidizing agent.

10. The solid electrolytic capacitor as claimed in claim 1, wherein the porous valve-acting metal substrate has a plate- or foil-like shape.

11. The solid electrolytic capacitor as claimed in claim 1, wherein the porous valve-acting metal is a simple metal selected from a group consisting of aluminum, tantalum, niobium, titanium, zirconium, magnesium and silicon, or an alloy thereof.

12. The solid electrolytic capacitor as claimed in claim 1, wherein the monomer of the organic polymer for forming the electrically conducting polymer is a compound containing a 5-member heterocyclic ring, or a compound having an aniline skeleton.

13. The solid electrolytic capacitor as claimed in claim 12, wherein the compound containing a 5-member heterocyclic ring is a compound having a thiophene skeleton or a polycyclic sulfide skeleton.

14. The solid electrolytic capacitor as claimed in claim 13, wherein the monomer compound having a thiophene skeleton is 3-ethylthiophene, 3-hexylthiophene, 3,4-dimethylthiophene, 3,4-methylenedioxythiophene or 3,4-ethylenedioxythiophene.

15. The solid electrolytic capacitor as claimed in claim 1, wherein a part of the solid electrolyte layer formed of the electrically conducting polymer has a lamella structure or a fibril structure.

16. A solid electrolytic multilayer capacitor obtained by stacking a plurality of capacitor elements described in claim 1.

17. A solid electrolytic multilayer capacitor comprising a capacitor element obtained by stacking a plurality of porous valve-acting metal substrates each having on the dielectric film surface thereof a solid electrolyte layer comprising an electrically conducting polymer resulting from oxidative polymerization of a monomer of an organic polymer with an oxidizing agent, compressing the multilayer substrate in the thickness direction, providing a cathode layer on the outer surface of the solid electrolyte layer, and re-electrochemical formation after the compressing step.

18. The solid electrolytic multilayer capacitor as claimed in claim 17, wherein the compressibility of the entire multilayer substrate having provided thereon solid electrolyte layers is from 5 to 90%.

19. A method for producing a solid electrolytic capacitor, comprising forming a solid electrolyte layer of an electrically conducting polymer on the surface of a porous valve-acting metal substrate having a dielectric film by using a solution containing a monomer for forming an electrically conducting polymer under the action of an oxidizing agent and a solution containing an oxidizing agent, compressing the substrate having provided thereon an electrically conducting polymer in the thickness direction and providing a cathode layer on the solid electrolyte layer, further comprising a re-electrochemical formation step after the step of compressing the substrate having provided thereon a solid electrolyte layer in the thickness direction.

20. The method for producing a solid electrolytic capacitor as claimed in claim 19, wherein the entire substrate having provided thereon a solid electrolyte layer is compressed at a compressibility of 5 to 90%.

21. The method for producing a solid electrolytic capacitor as claimed in claim 19, wherein assuming that the maximum thickness and the minimum thickness of the electrically conducting polymer layer including the substrate before the compression are Hamax and Hamin, respectively, and that the maximum thickness and the minimum thickness of the electrically conducting polymer layer including the substrate after the compression are Hbmax and Hbmin, respectively, the compression is performed such that the percentage decrease $\Delta H$ in the difference of thickness represented by the following formula is within a range of 5 to 95%:

$$\Delta H(\%) = \left[1 - \frac{(Hb\max - Hb\min)}{(Ha\max - Ha\min)}\right] \times 100.$$

22. The method for producing a solid electrolytic capacitor as claimed in chain 19, which comprises a humidification aging step after the step of compressing the substrate having provided thereon a solid electrolyte layer in the thickness direction.

23. The method for producing a solid electrolytic capacitor as claimed in claim 22, wherein the humidification aging step is performed at an electrochemical forming voltage lower than the sparking voltage under the conditions of 20 to 95° C. and 40 to 95% RH.

24. A method for producing a solid electrolytic capacitor, comprising forming a solid electrolyte layer of an electrically conducting polymer on the surface of a porous valve-acting metal substrate having a dielectric film by using a solution containing a monomer for forming an electrically conducting polymer under the action of an oxidizing agent and a solution containing an oxidizing agent, stacking a plurality of substrates each having provided thereon an electrically conducting polymer, compressing the multilayer substrate in the thickness direction and providing a cathode layer on the outer surface of the solid electrolyte layer, further comprising a re-electrochemical formation step after the step of compressing the substrate having provided thereon a solid electrolyte layer in the thickness direction.

25. A method for producing a solid electrolytic capacitor, comprising forming a solid electrolyte layer of an electrically conducting polymer on the surface of a porous valve-acting metal substrate having a dielectric film by using a solution containing a monomer for forming an electrically conducting polymer under the action of an oxidizing agent and a solution containing an oxidizing agent, compressing the substrate having provided thereon an electrically conducting polymer in the thickness direction, providing a cathode layer on the solid electrolyte layer, and compressing the cathode layer in the thickness direction, further comprising a re-electrochemical formation step after the step of compressing the substrate having provided thereon a solid electrolyte layer in the thickness direction.

* * * * *

UNITED STATES PATENT AND TRADEMARK OFFICE
CERTIFICATE OF CORRECTION

PATENT NO. : 7,388,741 B2  Page 1 of 1
APPLICATION NO. : 10/535812
DATED : June 17, 2008
INVENTOR(S) : Hiroshi Konuma It is certified that error appears in the above-identified patent and that said Letters Patent is hereby corrected as shown below:

Title Page
(73) Assignee, delete "Show A Denko K.K., Tokyo, Japan" and insert -- Showa Denko K.K., Tokyo, Japan --

Signed and Sealed this

Eighteenth Day of November, 2008

JON W. DUDAS
*Director of the United States Patent and Trademark Office*